US008015098B2

(12) United States Patent
Courbois et al.

(10) Patent No.: US 8,015,098 B2
(45) Date of Patent: Sep. 6, 2011

(54) SELL-SIDE BENCHMARKING OF SECURITY TRADING

(75) Inventors: Claude Courbois, Gaithersburg, MD (US); Jeffrey F. Kimsey, Bethesda, MD (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 1668 days.

(21) Appl. No.: 10/941,398

(22) Filed: Sep. 15, 2004

(65) Prior Publication Data

US 2006/0059078 A1    Mar. 16, 2006

(51) Int. Cl.
*G06Q 40/00*    (2006.01)
(52) U.S. Cl. .......... 705/37; 705/36 R
(58) Field of Classification Search .......... 705/36 R, 705/37
See application file for complete search history.

(56) References Cited

U.S. PATENT DOCUMENTS

| 2001/0049651 | A1* | 12/2001 | Selleck | 705/37 |
|---|---|---|---|---|
| 2002/0194107 | A1* | 12/2002 | Li et al. | 705/37 |
| 2003/0225660 | A1 | 12/2003 | Noser et al. | |
| 2004/0034591 | A1 | 2/2004 | Waelbroeck et al. | |
| 2004/0225592 | A1* | 11/2004 | Churquina | 705/37 |
| 2005/0234799 | A1* | 10/2005 | Hansen et al. | 705/37 |

OTHER PUBLICATIONS

Coffey, Brendan, "The Frugal Trader", May 1997, Wall Street & Technology, p. 28.*
"Tullett & Tokyo Liberty plc: Tullett tops VWAP transaction cost performance tables". Oct. 11, 2002. M2 Presswire.*
GSCS Global Securities Consulting Services. "Prospects: The Coming of Age of Transaction Cost Measurement". Summer 2001.*
The Toronto Stock Exchange Inc. (TSX). "Notice of Amendments and Commission Approval". Aug. 24 2004. <http://www.osc.gov.on.ca/MarketRegulation/Marketplaces/Exchanges/rr/TSE/xrr-tse_20030704_comm-approv-amend.jsp> Accessed via Internet Archives <http://www.archive.org>.*
Werner, Ingrid M., "NYSE Execution Costs", Jul. 31, 2001.*
"*Liquidity and Transaction Cost Measurement*", Chapter 21, www.PlexusGroup.com, pp. 420-441.
International Search Report dated May 8, 2007. International Application No. PCT/05/33097.

* cited by examiner

*Primary Examiner* — James A Kramer
*Assistant Examiner* — Eric T Wong
(74) *Attorney, Agent, or Firm* — Fish & Richardson P.C.

(57) ABSTRACT

A benchmark price reflective of trading in a financial instrument for benchmarking sell-side traders performance is provided by calculating based on received trades a buy volume weighted average price and a sell volume weighted average price for every contra-side party trading in a selected security during a period of time. Ineligible contra-parties are filter out from the determined buy and sell volume weighted average prices and the remaining contra-parties are ranked based on the determined volume weighted average prices from best price to worst to produce ranked, buy volume weighted average prices and ranked sell volume weighted average prices.

32 Claims, 4 Drawing Sheets

SELL-SIDE BENCHMARKING OF SECURITY TRADING

BACKGROUND

Institutional investors often use Volume Weighted Average Prices (VWAPs) to gauge whether they obtained a good price on a large order they sent to a sell-side trader. In the context of institutional trading, the "buy-side" refers to large investors (such as mutual funds) that 'buy' trading services from broker-dealers and the like. The "sell-side" refers to those broker-dealers and other types of traders that sell a service of buying and selling securities such as stock.

For example, consider a mutual fund manager who would like to purchase 1 million shares of a security. Releasing such a large order for the security to the market at one time might cause the market in the security to move against the order. Thus, to avoid this, the manager of the mutual fund may send such a buy order to a sell-side trader who "works the order," e.g., executing several buy orders over several hours. At some point, the order is filled. The mutual fund manager can determine that the sell-side trader obtained an average price of, e.g., $25, for shares over all of the buy orders in the security. However, the mutual fund manager may want to know whether the $25 average price was a good price for that order at that time. The only readily available benchmark that exists which can be used by the manager to access if it received a good average price is the volume weighted average price of all transactions that occurred during the period (VWAP).

SUMMARY

The volume weighted average price (VWAP) is a simple weighted average of all transactions that occurred during a period. The VWAP includes a multitude of different trade sizes and trading strategies, including situations where getting the best price was not the trader's goal. Beating such an average is not an appropriate standard to set for traders. In some cases the VWAP benchmark will be too low either because it includes many trades where achieving the best price was not the goal (such as when the goal is to trade quickly, irrespective of price) or because it includes all market participants, even those that performed poorly during that period. In other cases, the VWAP benchmark is too high because it includes market participants who were not working large customer orders.

According to an aspect of the present invention, a method executed in a computer system includes receiving trades that include contra-side party information for each side of the trade. The method also includes calculating, in a computer based on the received trades, a buy volume weighted average price and a sell volume weighted average price for every contra-side party trading in a selected security during a selected period of time. The method also includes filtering out ineligible contra-parties to the determined volume weighted average buy and sell prices, and ranking the remaining contra-parties based on the determined volume weighted average prices from best price to worst to produced ranked buy and sell volume weighted average prices for the contra-parties.

At least the following embodiments are within the scope of the invention. The method determines the selected time interval over which to calculate the buy and sell weighted average prices. Determining the time interval takes into consideration the trading activity of the security. Ineligible trades are filtered out and remaining trades are used to determine the buy volume weighted average prices and sell volume weighted average prices for every market participant trading during the period. Filtering ineligible contra-parties includes determining whether contra-parties are firms that do not provide trading services or firms that only bought or sold a small amount of shares. The method is performed the method for a single security. The method is performed for plural securities over different intervals of time, which intervals are determined at least in part based on trading characteristics of each of the plural securities. Products are produced based at least in part on the ranked buy and sell volume weighted average prices. The products are broadcast over a network.

According to an additional aspect of the present invention, a computer program product determines a benchmarking price reflective of trading in a financial instrument. The product includes instructions for causing a processor to calculate in a computer based on received trades a buy volume weighted average price and a sell volume weighted average price. The prices are calculated for every contra-side party trading in a selected security during a period of time. Buying and selling volume weighted average prices are filtered out for ineligible contra-parties. The computer program product also includes instructions to rank remaining contra-parties based on the determined volume weighted average prices from best price to worst to produce a ranked, buy volume weighted average price and rank remaining contra-parties based on the determined volume weighted average prices from best price to worst to produce a ranked, sell volume weighted average price.

According to an additional aspect of the present invention, a computer system includes a processor, a memory and a computer program product residing on a computer readable medium. The product is for determining a benchmarking price reflective of trading in a financial instrument. The product includes instructions for causing the computer system to calculate a buy volume weighted average price and a sell volume weighted average price based on received trades for every contra-side party trading in a selected security during a period of time. The product filters out the determined buy and sell volume weighted average prices for ineligible contra-parties. The product also ranks remaining contra-parties based on the determined volume weighted average prices from best price to worst to produce a ranked, buy volume weighted average price and ranks remaining contra-parties based on the determined volume weighted average prices from best price to worst to produce a ranked, sell volume weighted average price.

According to an additional aspect of the present invention, a method of disseminating benchmarking information over an electronic network includes receiving a ranking of contra-parties based on determined volume weighted average prices, from best price to worst price, for a set of sell transactions. The method also includes receiving a ranking of contra-parties based on determined volume weighted average prices, from best price to worst price, for a set of buy transactions. The method includes producing a ranked, buy volume weighted average price for the contra-parties and a ranked sell volume weighted average price for the contra-parties and publishing, over the electronic network the buy volume weighted average price for the contra-parties and the sell volume weighted average price for the contra-parties.

One or more aspects of the invention may provide one or more of the following advantages.

The invention determines a competitive volume weighted average price (CVWAP), which is a more appropriate benchmark for traders working large orders. The CVWAP is constructed from a sub-set of trades that most likely reflect trading skills of the market participants represented in the sub-set of trades. The CVWAP is constructed from a sub-set of participants who are most likely working large amounts of volume. The CVWAP thus, represents the best performance among market participants that are working large orders. The CVWAP prices can be used to construct data products that can be used to more accurately gauge how sell-side traders perform in handling orders for buy-side participants.

DESCRIPTION

Figure 1:
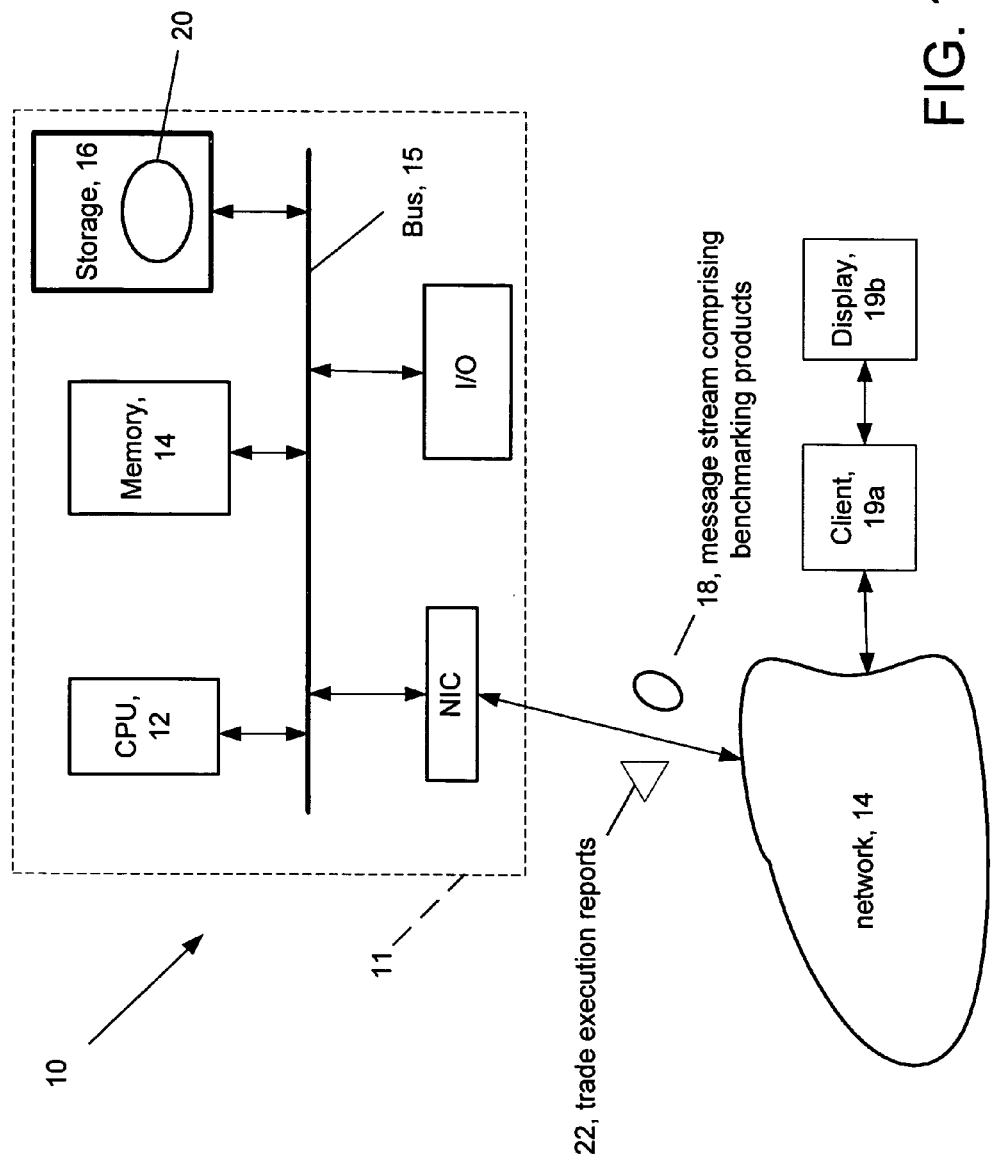
FIG. 1 is a block diagram of a computer system in a network.

Referring to FIG. 1, a system 10 includes a computer 11 that includes a programmable processor 12, random access memory (RAM) 14, storage 16, e.g., a hard drive, and an input/output (I/O) controller 16, all coupled by a bus 15. Storage 16 stores executable computer programs, including programs embodying a Competitive Volume Weighted Average Price (CVWAP) process 20 for calculating price benchmarks and for publishing price benchmark products based on the competitive volume weighted average price. Buy-side investors can use the products produced from the competitive volume weighted average process 20 to determine whether their sell-side trader obtained a good price for a large transaction. Other interfaces, programs, such as an operating system, and devices user such as user interface devices can be included.

In addition, the system 11 includes a network interface card (NIC) or the like for broadcasting a message stream 18 comprising a data that includes Competitive Volume Weighted Average Price (CVWAP) derived price benchmarks. The message stream 18 is typically broadcast over a network 14, using convention network based protocols. The message stream 18 can be broadcast over the Internet to the public, or can be broadcast to subscribers over private or virtual private networks, video and audio networks and so forth. In one embodiment, the message stream 18 is received by, e.g., a client system 19a, and is displayed on a display 19a or otherwise rendered to a user at the client system 19a.

In some embodiments, the computer 11 is a server type of computer and can be included in a cluster of such computers. The computer 11 can be responsible for more than just Competitive Volume Weighted Average Price (CVWAP) process 20 and can be used in electronic trading, electronic reporting of trades and so forth. In addition, in a practical system, several computers can be used to perform the various functions discussed above.

The computer 11 receives trade executions or confirmations of executions 22. The computer 11 can load the Competitive Volume Weighted Average Price (CVWAP) process 20 into memory 14, so that the processor 12 executes the process 20. Trades in securities are generally electronically tracked and reported (e.g., derived from trade or execution reports 22), whether trading is in a computerized trading system or floor trading system, or some hybrid trading model. The trade reporting includes information associated with the executed trade such as the particular security traded, the volume traded, the price of the trade, parties to the trade, and so forth. The computer system 11 receives numerous trade reports 22 associated with various securities traded over the course of a trading day. The Competitive Volume Weighted Average Price (CVWAP) process 20 uses the received trade reports to determine the Competitive Volume Weighted Average Price (CVWAP) for each of the securities over various time intervals, e.g., continuously, every 30 minutes, every hour, or every day and so forth, depending on the characteristics of the security.

In a computerized trading system 10, the market participants, electronically trade with other market participants (as opposed to trading on a trading floor). An example of an electronically trading system is the Nasdaq Stock Market® and an example of a floor-trading system is the New York Stock Exchange®. In general, trade reporting is computerized whether floor trading or electronic trading is performed. To keep an appropriate accounting of executed trades, the trading venue can require that each trade report be received within a fixed time-period, e.g., 90 seconds, after each respective trade is executed. Due to increases in computation speed and network bandwidth, computer 11 typically receives trade reports nearly instantly after the execution of the respective trade.

Market participants are typically, market makers, specialists, broker/dealers, electronic communication networks (ECN's), exchanges with unlisted trading privileges (UTP exchanges) or any other entity that can post orders to an exchange or market. In some trading venues, such as a market, one or many market makers make markets in a particular security, whereas in other trading venues, such as an exchange, generally a single specialist handles trading for a particular security. Still in other venues, trading occurs via a matching network.

Figure 2A:
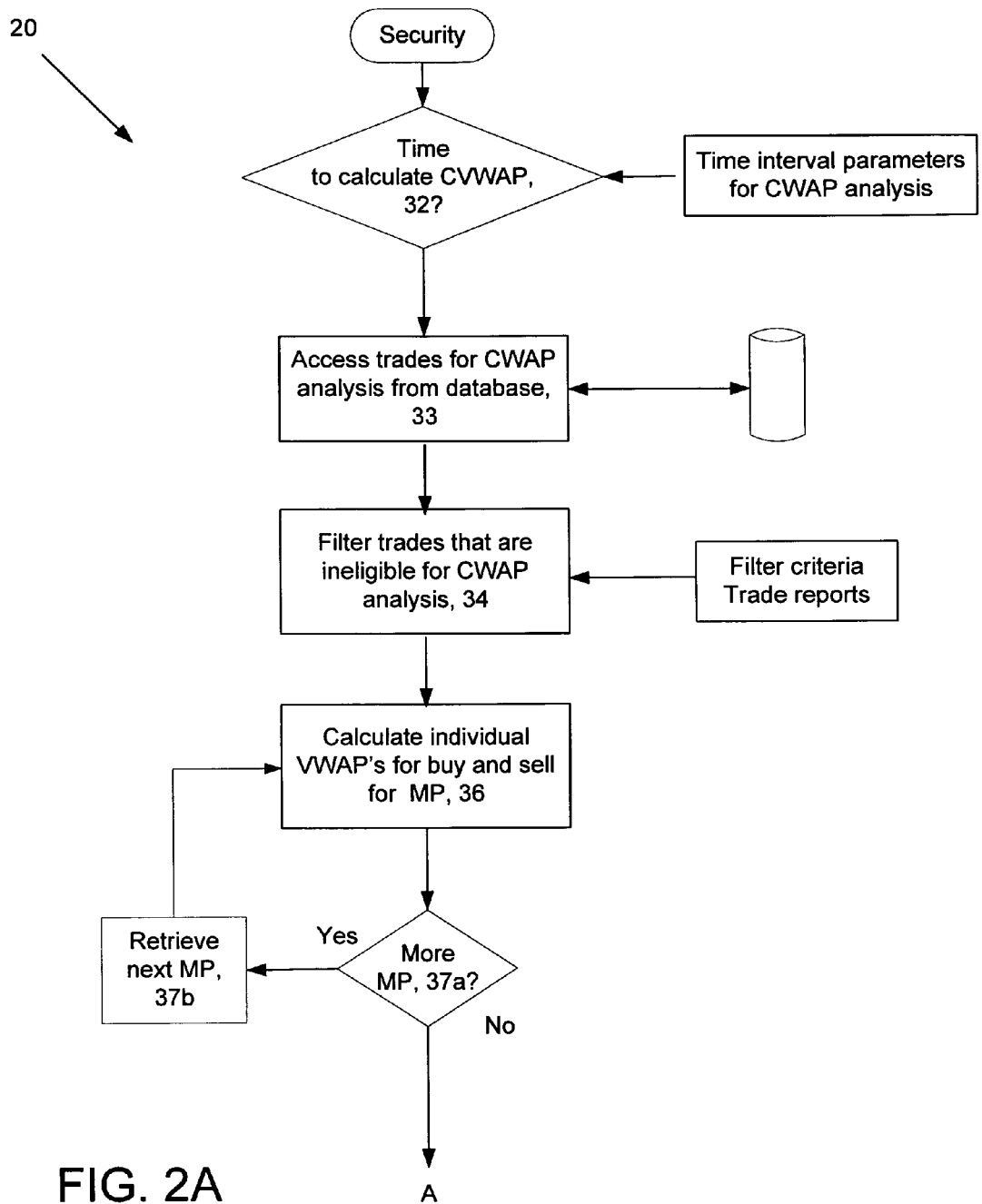
FIGS. 2A and 2B are a flow chart depicting a benchmarking process.
Figure 2B:
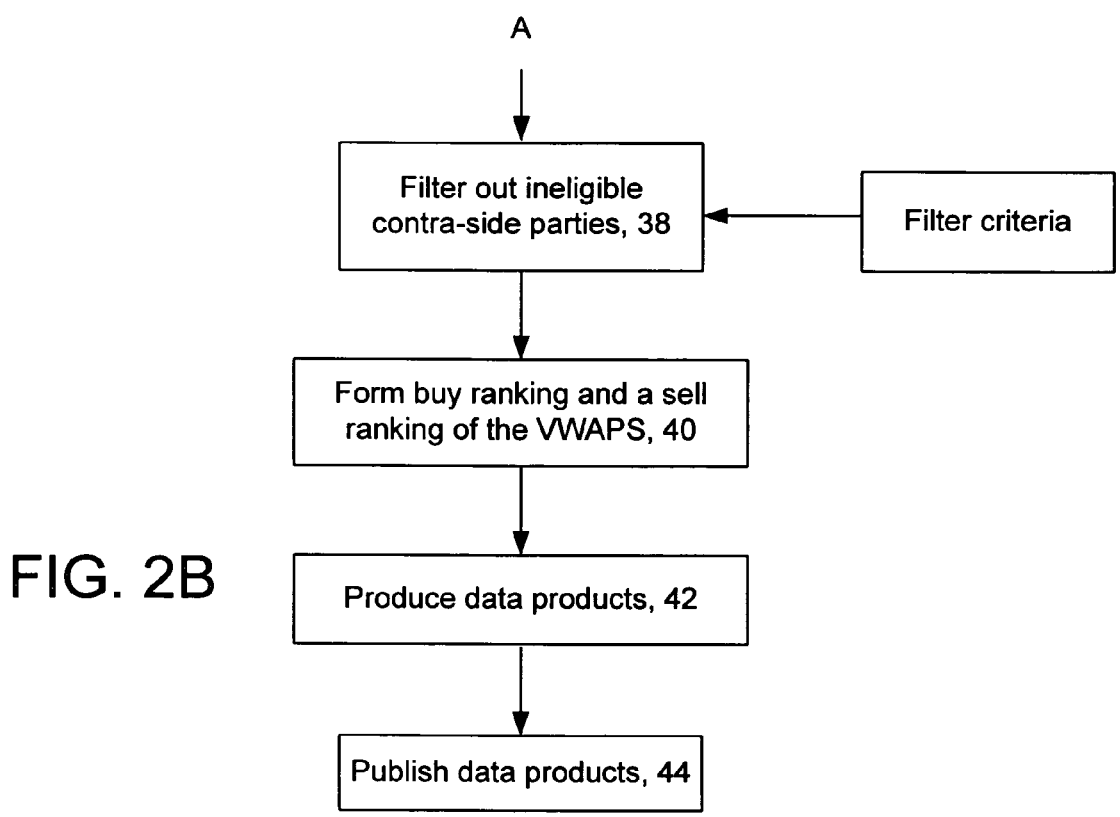

Referring to FIGS. 2A and 2B, mutual funds and other institutional investors and the like, often give large orders to "sell-side traders," i.e., traders that sell their trading services to institutional investors, which are commonly denoted as buy-side traders, i.e., investors that buy trading services from the sell-side traders. An exchange, market, or other trading venue such as an electronic commerce network (ECN), has the trade information in the trade reports that enables the trading venue to produce benchmarks for specialized trading. Such trading venues have access to trading information such as party and the contra-side party to a transaction.

The computer 11 executes the competitive Volume Weighted Average Price (CVWAP) process 20 to determine a CVWAP benchmark price for each stock traded in the trading venue or for each stock that is actively trading in the trading venue and so forth. The competitive Volume Weighted Average Price (CVWAP) is calculated at various intervals of the day which can vary depending on the stock that it is being calculated for. Time intervals can be very short for securities that trade a large number of shares over short periods of time or can be longer time intervals, perhaps even one per day or per week, for securities that trade less actively. Factors that can be used to assess a suitable time interval for a particular stock include, choosing the time interval by setting a minimum dollar value that should be traded during the period for each issue. Thus, if the minimum dollar value is $100,000, and the possible intervals are 5 minutes, 30 minutes, 1 hour, 1 day, and 1 week, then each stock is assigned the interval that is closest to the time it takes on average for that issue to trade $100,000 of value. Other factors can be used. The time period is one parameter used to determine whether to initiate a determination of the CVWAP.

The CVWAP determines 32 if an appropriate time interval has been reached to start the competitive VWAP process for a particular security. For each security for which a CVWAP is desired, the CVWAPs process 20 access 33 trades in that particular security that occurred during the period. The trades can be in various formats and are typically retrieved from a database or flat file.

The process filters 34 out trades that are ineligible for the competitive VWAP benchmark. Ineligible trades may include trades that do not represent "street trading." Examples of ineligible trades include print-back trades (where a trader finishes working an order for a client, and prints a trade with that client to transfer the shares to the client), crosses (where a firm internally crosses two customer orders, one to sell and another to buy), or trades that occur in a closing cross. Ineligible trades may also include trades reported late or with other trade report modifiers that would indicate that the trade does not represent the trading expertise of the firm.

From the filtered trades, the process calculates 36 an individual buy VWAP and sell VWAP of each market participant. These calculations are performed for every market participant trading during the period. The process 36 thus produces two lists of VWAPS sorted by market participant. For example, if market participant "ABCD" had 22 buy executions in a security "XXXX" during the period then the process 36 calculates market participant's ABCD's buy VWAP over those trades as follows:

$$\text{Buy-}VWAP_{ABCD}=(\Sigma(\text{volume}_i * \text{price}_i))/(\Sigma \text{volume}_i).$$

The process 36 also calculates a sell VWAP for market participant ABCD for transactions where the market participant was selling security XXXX, as follows:

$$\text{Sell-}VWAP_{ABCD}=(\Sigma(\text{volume}_i * \text{price}_i))/(\Sigma \text{volume}_i).$$

That is, for a buy VWAP, the process determines the sum of the market value (market value is share volume times price) of every buy transaction for the market participant (ABCD) for the security i, (where "i" is security XXXX). The process 36 determines the sum of the share volumes of all buys of security i during the period and divides the market value for the market participant (ABCD) by the total volume of all transactions in (security i) of the participant. The Sell VWAP is similar except that all of the values used in the market value pertain to sell transactions for that participant. The process 20 determines if there are more market participants 37*a*, if so the next market participant is retrieved, 37*b* and the process 36 is repeated for all other market participants that participated in transactions during the period.

If there are no further, market participants that participated in transactions during the period, the process filters 38 out ineligible contra-parties. Ineligible contra-parties can include firms that do not provide trading services or firms that only bought or sold a small amount of shares. This is done because this is a benchmark for traders that provide trading services and that trade large orders. A benchmark should not compare such traders who have different trading goals or who executed only small amount of volume (a much easier task that may result in a better price that no one could have obtained for a large order) to traders that are working order, e.g., sell-side traders or traders that are executing large proprietary orders. The process 20 applies market participants filter parameters to filter out the ineligible contra-side parties. For instance, a filter parameter can be that the minimum value that each eligible trader trades is at least, e.g., $10,000 of stock value. The minimum values could also be set individually depending on the overall market for a particular security. For instance, a heavily traded large capitalized stock might require the $10,000 threshold whereas a small capitalized stock with much lower trading volume may require, e.g., $2,000 in value. Other values for minimum traded amounts and indeed other types of filter parameters can be used.

After filtering the ineligible contra-side parties the process 20 ranks 40 the remaining VWAPs from best price to worst. Thus, for a "buy VWAP calculation" the best price is the lowest price and for a "sell VWAP calculation" the best price is the highest price. The process 20 produces 42 and broadcasts 44 products that are derived from the CVWAP.

Figure 3:
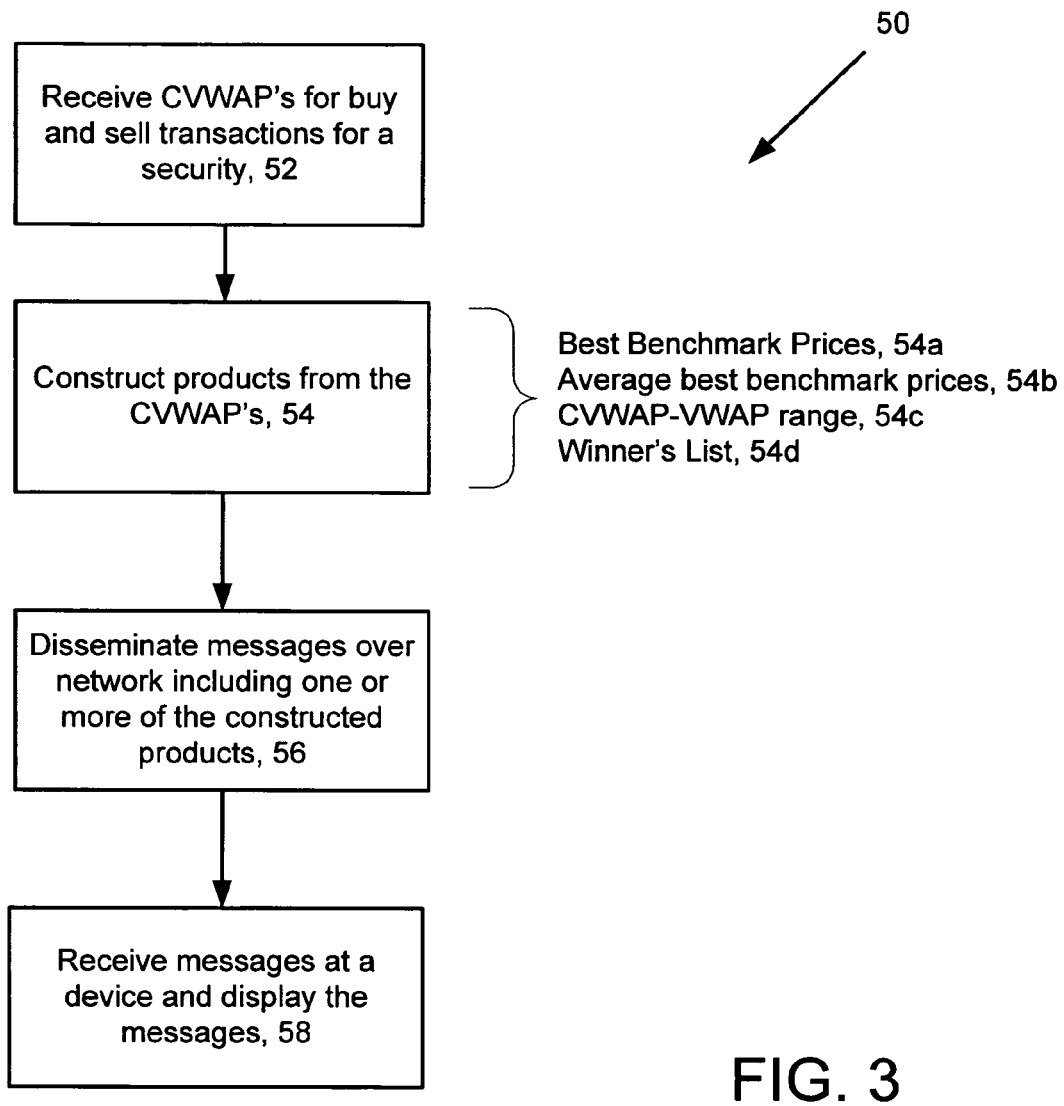
FIG. 3 is a flow chart depicting a process for publishing products derived from the benchmarking process in FIG. 2.

Referring to FIG. 3, a process 50 to broadcast data products constructed from the CVWAP is shown. The process 50 receives 52 a CVWAP for buy transactions and a CVWAP for sell transactions, and constructs 54 one or more products from the received CVWAPS. One product that can be constructed 54*a* is a "CVWAP Best Benchmark Price" This would be the single best VWAP price obtained by any market participant. Because two VWAPs are calculated for each CVWAP, one for buy transactions and one for sell transactions, the best VWAP may not be from the same market participant. A second product constructed 54*b* is a "CVWAP Average Benchmark Price." The CVWAP Average Benchmark Price could alternatively be the volume-weighted average VWAP of, e.g., the top 3 participants (volume-weight the average of the VWAPs). This benchmark is a slightly lower benchmark, but recognizes the possibility that a single participant might be a anomaly.

A third product constructed 54*c* is a "CVWAP-VWAP Range." This product gives the range between the CVWAPs (buy and sell) and either the worst market participant VWAPs or the overall VWAP. A very narrow range indicates that the best market participant performance was not very different from the overall average, an indication that trader-selection is not very important in that stock. A wide range indicates that certain participants obtained much better buy and sell prices, an indication that trader selection is very important in that stock. A fourth product constructed 54*d* is a "CVWAP Winners List" The CVWAP Winners List is a list of market participants that achieved the benchmark price most often or for the greatest traded value over a period of time.

Process 50 disseminates 56 over the network messages that represent those products derived from the CVWAP process 20. The messages include values of one or more of the products. The disseminated messages are received 58 from the network, e.g., by subscribers at client systems 19*a* or by the general public. Receiving the messages includes displaying 58 the messages on a display of user device 19*a*. Various types of user devices can be used to display the messages.

The messages can include at least the following fields: security name and/or ticker symbol, time-period, as well as messages that represent the products derived from the CVWAP. The "CVWAP Best Benchmark Price (BBP) would include at least two fields a best VWAP for buy transactions and a best VWAP for sell transactions. The "CVWAP Average Benchmark Price" would include at least two fields one for buy transactions and one for sell transactions. The "CVWAP-VWAP Range" would include at least one field with the CVWAP-VWAP range value. An exemplary message format shown in TABLE 1 can also include the conventional VWAP price that is based on both buy and sell transactions, since it is not screened by market participants.

TABLE 1

| Symbol | Time-period | CVWAP BBP buy | CVWAP BBP sell | CVWAP Average Benchmark Price buy | CVWAP Average Benchmark Price sell | CVWAP-VWAP Range | VWAP |
|---|---|---|---|---|---|---|---|

Another, message (an exemplary format of which is shown in TABLE 2) could be the "CVWAP Winners List" that would list market participants that achieved the benchmark price most often or for the greatest traded value over a period of time. The Table 2 below gives an illustrative format, where the identifications of the market participants "ABCD" and so forth are derived from values in Table 3 discussed below. The fields could include the market participant identification, e.g., "ABCD" as shown, and a rating value, derived as discussed below. In addition, a practical winners list could include only a sub-set of all market participants, e.g., the top 5 as shown below or the top three, etc. Of course publishing the entire list is possible.

TABLE 2

| | | Highest ranked market participant | Second highest market participant | Third highest market participant | Fourth highest market participant | Fifth highest market participant |
|---|---|---|---|---|---|---|
| Symbol | Time-period of rating value | "ABCD" RATING VALUE | "EFGH" RATING VALUE | "IJKL" RATING VALUE | "MNOP" RATING VALUE | "QRST" RATING VALUE |

In addition, the winner list can be based on many different criteria derived from the CVWAP process. For instance, a winner's list can include market participants for a single security, as shown above, or can be a winner's list of an industry sector, winner's list of just large capitalization stocks, small capitalization stock, a particular market index, or across all securities listed on an entire market or exchange.

For example, TABLE 3 below provides the participant-level VWAP for "buys" of a security between 9:30 and 9:35 for market participants that bought at least 10,000 shares. The market participant that obtained the best price (market participant "ABCD") paid about $0.12 less per share than market participant "HJLN" that got the worst price.

TABLE I

| Market Participant | Value | Volume | VWAP |
|---|---|---|---|
| ABCD | 310,126 | 14,600 | $21.242 |
| EFGH | 222,845 | 10,490 | $21.244 |
| IJKL | 2,802,270 | 131,841 | $21.255 |
| MNOP | 1,539,829 | 72,442 | $21.256 |
| QRST | 812,630 | 38,224 | $21.260 |
| UVWX | 1,877,990 | 88,311 | $21.266 |
| YZAB | 351,938 | 16,546 | $21.270 |
| CDEF | 581,103 | 27,318 | $21.272 |
| GHIJ | 460,161 | 21,628 | $21.276 |
| KLMN | 308,092 | 14,480 | $21.277 |
| OPQR | 295,335 | 13,880 | $21.278 |
| STUV | 665,399 | 31,271 | $21.278 |
| WXYZ | 405,340 | 19,049 | $21.279 |
| BCDE | 335,391 | 15,760 | $21.281 |
| FGHI | 2,336,923 | 109,789 | $21.286 |
| JKLM | 2,102,482 | 98,773 | $21.286 |
| NOPQ | 554,699 | 26,059 | $21.286 |
| RSTU | 1,841,462 | 86,500 | $21.289 |
| VWXY | 899,049 | 42,229 | $21.290 |
| ZABC | 792,496 | 37,215 | $21.295 |
| DEFG | 294,012 | 13,806 | $21.296 |
| HIJK | 573,478 | 26,925 | $21.299 |
| LMNO | 912,059 | 42,810 | $21.305 |

TABLE I-continued

| Market Participant | Value | Volume | VWAP |
|---|---|---|---|
| PQRS | 217,029 | 10,186 | $21.307 |
| TUVW | 1,289,909 | 60,532 | $21.310 |
| XYZA | 309,029 | 14,500 | $21.312 |
| BDFH | 519,808 | 24,390 | $21.312 |
| JLNP | 381,628 | 17,900 | $21.320 |
| RTVX | 965,555 | 45,279 | $21.325 |
| ZBDF | 325,906 | 15,272 | $21.340 |
| HJLN | 832,563 | 38,975 | $21.361 |

In this case, the CVWAP Best Benchmark Price would be $21.242, (market participant's "ABCD" price). The CVWAP Average Benchmark Price for the top 3 participants would be 21.253. The range (best to worst) would be $0.12. The range (best to VWAP) would be $0.06 (the VWAP was $21.302), and market maker ABCD would earn credit toward being on the CVWAP winners list at the end of the month.

At the end of a period, the trading venue can produce rating values used to rank market participants based on how they performed over the day, week, or month, and so forth. A message corresponding to the winners list is produced from the rating values and ranking based on the rating values. In some embodiment, not all market participants are eligible for rating/ranking. For example, rating values need not be provided for firms that do not provide trading services.

A simple rating value can be constructed by giving each market participant a point for each half-hour (or other period, e.g., fraction of a day) that the market participant set the CVWAP. Market participants could also earn fractions of a point for achieving prices better than the VWAP but not as good as the CVWAP. The number of points could be a function of the number of cents by which they beat the ordinary VWAP. The advantage of the simple rating value is that small firms that do relatively little volume would be more likely to earn a rating.

Another rating value can be constructed by allocating points based on the number of shares traded and the number of cents that a participant beat the ordinary VWAP. Each participant that achieved an individual competitive VWAP that beat the ordinary VWAP would earn points calculated as the product of the number of shares and the number of cents that they beat the VWAP.

Whichever way points are allocated to the rating values, at the end of the period the points are added and the market participants are ranked based on the rating values. Rankings could be calculated for the market overall, for sectors (such as "Top CVWAP Market Makers in Health Care Stocks"), and for individual stocks.

The VWAP is a simple average of all transactions that occurred during a period. The VWAP includes a multitude of different trade sizes and trading strategies, including situations where getting the best price was not the trader's goal. Beating such an average is not an appropriate standard to set for traders. In some cases the VWAP benchmark will be too low either because it includes many trades where achieving the best price was not the goal (such as when the goal is to trade quickly, irrespective of price) or because it includes all market participants, even those that performed poorly during that period. In other cases, the VWAP benchmark is too high because it includes market participants who were not working large customer orders.

The CVWAP on the other hand is a more appropriate benchmark for traders working large orders. The CVWAP is constructed from a sub-set of trades that is most likely to reflect trading skills of the market participants represented in the sub-set of trades. The CVWAP is constructed from a sub-set of participants who are most likely working large amounts of volume. The CVWAP thus, represents the best performance among market participants that are working large orders.

The invention can be implemented in digital electronic circuitry, or in computer hardware, firmware, software, or in combinations thereof. Additionally, aspects of the invention can be implemented manually. For example, the calculations of the CVWAP can occur in systems that are part of trading system, reporting systems or off-line system that are feed data feeds and which publish some or all of the products discussed above. Also data structures can be used to represent the messages. These data structures can be stored in memory and in persistence storage and can be broadcast over the network.

Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks, removable disks, magneto-optical disks, and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

Other embodiments are within the scope of the appended claims. For example, the invention can be used to determine sell-side benchmarking products for other types of securities besides stocks or equities. That is, the benchmarking can be used to determine a benchmark price for securities such as options, bonds, ETF (electronically traded funds) or any other situation where there are diversity in trading situations and it is desired to produce a price reflective of a particular trading situation.

What is claimed is:

1. A method executed in a computer system, the method comprising:
   receiving reports of trades in securities, each of the trades including contra-side party information for each side of each trade;
   for a plurality of contra-side parties, calculating, by one or more computers, based on the received reports of trades, a buy volume weighted average price associated with a particular party buying a selected security during a selected period of time and a sell volume weighted average price associated with the particular party selling the selected security during the selected period of time;
   filtering out, by the one or more computers, ineligible contra-parties to the calculated volume weighted average buy and sell prices to generate a set of remaining contra-parties; and
   generating, by the one or more computers, a first ranking comprising ranked buy volume weighted average prices for the remaining, contra-parties by ranking the remaining contra-parties based on the calculated buy volume weighted average prices from best price to worst price; and
   generating, by the one or more computers, a second ranking that is separate from the first ranking, the second ranking comprising ranked sell volume weighted average prices for the remaining, contra-parties by ranking the remaining contra-parties based on the calculated sell volume weighted average prices from best price to worst price.

2. The method of claim 1 further comprising:
   determining the selected period of time over which calculating of the buy and sell weighted average prices are determined based at least in part on the trading activity of the security.

3. The method of claim 1, further comprising:
   determining the selected period of time over which calculating of the buy and sell weighted average prices are determined -based at least in part on the trading activity of the security with the selected period of time differing for different securities.

4. The method of claim 1 further comprising:
   filtering by the one or more computers ineligible trades from the remaining trades with filtering based on a criteria; and
   using remaining, filtered trades in generating the buy volume weighted average prices and sell volume weighted average prices for market participants trading during the selected period.

5. The method of claim 1 wherein filtering ineligible contra-parties comprises determining whether contra-parties are firms that do not provide trading services or firms that only bought or sold a small amount of shares.

6. The method of claim 1 further comprising repeating the method over subsequent, selected periods of time.

7. The method of claim 1 further comprising performing the method for a single security.

8. The method of claim 1 further comprising performing the method for plural securities over different intervals of time, which intervals are determined at least in part based on trading characteristics of each of the plural securities.

9. The method of claim 1 further comprising producing data feed products based at least in part on the ranked volume weighted average prices for buy and sell volume weighted average prices.

10. The method of claim 9 further comprising broadcasting the data feed products over a network.

11. The method of claim 1 wherein filtering out ineligible contra-parties comprises determining whether contra-parties are firms that do not provide trading services or firms that only bought or sold a small amount of shares.

12. The method of claim 1 further comprising repeating the method over subsequent, selected periods of time.

13. The method of claim 1 further comprising producing products based at least in part on the ranked volume weighted average prices for buy and sell volume weighted average prices.

14. The method of claim 13 further comprising broadcasting the products over a network.

15. A non-transitory computer readable medium comprising instructions for causing a computer to:
for a plurality of contra-side parties, calculate, based on received trades, a buy volume weighted average price associated with a particular party buying a selected security during a period of time and a sell volume weighted average price associated with the particular party selling the selected security during the period of time;
filter out calculated buy and sell volume weighted average prices for ineligible contra-parties to generate a set of remaining contra-parties;
generate a first ranking comprising ranked buy volume average prices for the remaining contra-parties based on the calculated volume weighted average prices from best price to worst price to produce a ranked, buy volume weighted average price; and
generate a second ranking that is separate from the first ranking, the second ranking comprising ranked sell volume weighted average prices for the remaining contra-parties based on the calculated volume weighted average prices from best price to worst to produce a ranked, sell volume weighted average price.

16. The computer program product of claim 15 further comprising instructions to determine the selected period of time over which to calculate the buy and sell weighted average prices based at least in part on the trading activity of the security.

17. The computer program product of claim 15 further comprising:
instructions to determine the period of time based at least in part on the trading activity of the security with the selected period of time differing for different securities.

18. The computer program product of claim 15 further comprising instructions to:
filter out ineligible trades from the remaining trades with filtering based on a criteria; and
provide remaining filtered trades to generate the buy volume weighted average price and sell volume weighted average price for every market participant trading during the selected period of time.

19. The computer program product of claim 15 wherein instructions to filter ineligible contra-parties further comprises instructions to determine whether contra-parties are firms that do not provide trading services or firms that only bought or sold a small amount of shares.

20. The computer program product of claim 15 further comprising instructions to perform the method for plural securities over different periods of time, which periods are determined at least in part based on individual trading characteristics of the plural securities.

21. The computer program product of claim 15 further comprising instructions to produce data feed products based at least in part on the ranked buy and sell volume weighted average prices.

22. The computer program product of claim 15 further comprising instructions to broadcast the data feed products over a network.

23. A computer system comprising:
a processor;
a memory; and
a computer readable medium storing a computer program product, the computer program product for determining a benchmarking price reflective of trading in a financial instrument, the computer program product comprises instructions for causing the computer system to:
for a plurality of contra-side parties, calculate, based on received trades, a buy volume weighted average price associated with a particular party buying a selected security during a period of time and a sell volume weighted average price associated with the particular party selling the selected security during the period of time;
filter out calculated buy and sell volume weighted average prices for ineligible contra-parties to generate a set of remaining contra-parties;
generate a first ranking comprising ranked buy volume average prices for the remaining contra-parties based on the calculated volume weighted average prices from best price to worst price to produce a ranked, buy volume weighted average price; and
generate a second ranking that is separate from the first ranking, the second ranking comprising ranked sell volume weighted average prices for the remaining contra-parties based on the calculated volume weighted average prices from best price to worst to produce a ranked, sell volume weighted average price.

24. The system of claim 23, wherein the computer program product further comprises instructions to:
filter out ineligible trades; and
provide filtered trades to determine the buy volume weighted average price and sell volume weighted average price for every market participant trading during the period of time.

25. The system of claim 23, wherein the computer program product further comprises instructions to determine whether contra-parties are firms that do not provide trading services or firms that only bought or sold a small amount of shares.

26. The system of claim 23, wherein the computer program product further comprises instructions to determine the buy volume weighted average price and sell volume weighted average price for plural securities over different periods of time, which periods are determined, at least, in part, based on individual trading characteristics of the plural securities.

27. The system of claim 23, wherein the computer program product further comprises instructions to:
produce products based at least in part on the ranked buy and sell volume weighted average prices; and
broadcast the products over a network.

28. A non-transitory computer readable medium comprising instructions for causing a computer to:
for a plurality of contra-side parties, calculate, based on received, filtered trades, a buy volume weighted average price associated with a particular party buying a selected security during a period of time and a sell volume weighted average price associated with the particular party selling the selected security during the period of time, with the filtered trades excluding trades that occurred at closing, during a firm internal cross of orders from two of the firm's customers and print-back trades;

filter out the calculated buy and sell volume weighted average prices for ineligible contra-parties with ineligible contra-parties being parties that do not provide trading services or that only bought or sold a relatively small amount of shares during the period to generate a set of remaining contra-parties;

generate a first ranking comprising ranked buy volume average prices for the remaining contra-parties based on the calculated volume weighted average prices from best price to worst to produce a ranked, buy volume weighted average price; and generate a second ranking that is separate from the first ranking, the second ranking comprising ranked sell volume weighted average prices for the remaining contra-parties based on the calculated volume weighted average prices from best price to worst to produce a ranked, sell volume weighted average price.

29. The computer program product of claim 28 further comprising instructions to:
    determine the selected period of time over which calculating of the buy and sell weighted average prices are determined by:
        setting a minimum dollar value of securities traded; and
        determining possible periods of time; and
    assign one of the possible periods of time to a security according to the time it takes on average for that security to trade the minimum dollar value of securities.

30. The computer program product of claim 28 further comprising instructions to determine the buy volume weighted average price and sell volume weighted average price for plural securities over different periods of time, which periods are determined at least in part based on individual trading characteristics of the plural securities.

31. The computer program product of claim 28 further comprising instructions to:
    produce products based at least in part on the ranked volume weighted average prices for buy and sell volume weighted average prices; and
    broadcast the products over a network to client systems for display and or storage on the client systems.

32. A method executed in a computer system, the method comprising:
    processing, in a computer, at an end of a pre-determined time interval, information about trades that occurred during the pre-determined time interval for a particular security, each of the trades including contra-side party information for each side of the trade,
    filtering out ineligible trades that occurred during the pre-determined time interval
    for a plurality of contra-side parties, calculating, by one or more computers, based on the filtered trades, a buy volume weighted average price associated with a particular party buying a selected security during a selected period of time and a sell volume weighted average price associated with the particular party selling the selected security during the selected period of time;
    filtering out ineligible contra-parties to the calculated volume weighted average buy and sell prices to generate a set of remaining contra-parties; and
    generating, by the one or more computers, ranked buy volume weighted average prices for the remaining contra-parties by ranking the remaining contra-parties based on the calculated buy volume weighted average prices from best price to worst price; and
    generating, by the one or more computers, ranked sell volume weighted average prices for the remaining contra-parties by ranking the remaining contra-parties based on the calculated sell volume weighted average prices from best price to worst price.

* * * * *